United States Patent
Varsamis et al.

(10) Patent No.: US 6,366,531 B1
(45) Date of Patent: *Apr. 2, 2002

(54) METHOD AND APPARATUS FOR ACOUSTIC LOGGING

(75) Inventors: Georgios L. Varsamis; Laurence T. Wisniewski; Abbas Arian, all of Houston, TX (US)

(73) Assignee: Dresser Industries, Inc., Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/158,261

(22) Filed: Sep. 22, 1998

(51) Int. Cl.$^7$ ................................................. G01V 1/40
(52) U.S. Cl. ............................ 367/26; 367/27; 181/102; 181/103
(58) Field of Search ................................ 367/26, 31, 29, 367/25, 35, 27, 32, 73, 75; 181/102, 103, 107, 104; 364/422

(56) References Cited

U.S. PATENT DOCUMENTS

| | | | |
|---|---|---|---|
| 2,918,651 A | | 12/1959 | Podolak et al. ............... 340/8 |
| 3,188,607 A | | 6/1965 | Woodworth ................. 340/17 |
| 3,363,118 A | | 1/1968 | Sims .......................... 310/8.7 |
| 3,930,217 A | * | 12/1975 | Wiley .......................... 181/102 |
| 4,131,875 A | * | 12/1978 | Ingram ....................... 181/102 |
| 4,319,345 A | | 3/1982 | Dennis ........................ 367/25 |
| 4,562,557 A | | 12/1985 | Parks et al. ................. 367/27 |
| 4,594,691 A | | 6/1986 | Kimball et al. ............. 367/32 |
| 4,606,014 A | | 8/1986 | Winbow et al. ............. 367/75 |
| 4,649,525 A | | 3/1987 | Angona et al. ............. 1/40 |
| 4,658,383 A | * | 4/1987 | Zimmer ....................... 367/29 |
| 4,665,511 A | | 5/1987 | Rodney et al. ............. 367/35 |

(List continued on next page.)

FOREIGN PATENT DOCUMENTS

| | | |
|---|---|---|
| CA | 1 166 148 | 4/1984 |
| DE | 35 04011 A1 | 8/1986 |
| EP | 0 317 386 | 10/1988 |

(List continued on next page.)

OTHER PUBLICATIONS

Chudy, S. et al., "Cased Hole Acoustic Logging—A Solution to a Problem", SPWLA 36th Annual Logging Symposium, Jun. 26–29, 1995, Paper I.

Forbes, Douglass, "Detection of gas migration behind casing using ultrasonic imaging methods", Petroleum Society of CIM and AOSTRA Technical Conference, 1991, V. 1, Bannf, CA (Paper No. CIM/AOSTRA 91–39), pp. 39–1 thru 39–15.

Minear, John W., "Full Wave sonic logging: a brief perspective," SPWLA 27th Annual Logging Symposium, Jun. 9–13, 1986, paper AAA, pp. 1–21.

(List continued on next page.)

*Primary Examiner*—Safet Metjahic
*Assistant Examiner*—Anthony Jolly
(74) *Attorney, Agent, or Firm*—Jenkens & Gilchrist

(57) ABSTRACT

The invention is a method and apparatus for acoustic logging including one or more acoustic transmitters and one or more acoustic receivers. One or more of the elements of a set made up of the acoustic receivers and acoustic transmitters are spaced radially apart from one or more of the remaining elements of the set. The acoustic receivers and acoustic transmitters are configured along with electronics and software incorporated in the tool to allow the acoustic receivers and acoustic transmitters to act as multi-pole receivers and multi-pole transmitters, respectively. The tool is configured to compute one or more acoustic velocities and to provide storage for unprocessed and processed, compressed and error correction coded data. The tool is configured to provide the data for transmission to the surface.

20 Claims, 13 Drawing Sheets

U.S. PATENT DOCUMENTS

| | | | |
|---|---|---|---|
| 4,698,791 A | * 10/1987 | Cunningham | 367/25 |
| 4,703,460 A | 10/1987 | Kurkjian et al. | 367/31 |
| 4,791,619 A | * 12/1988 | Liu | 367/35 |
| 4,825,117 A | 4/1989 | Thomas, III et al. | 41/8 |
| 4,845,616 A | * 7/1989 | Phillips | 367/26 |
| 4,872,526 A | 10/1989 | Wignall et al. | 181/102 |
| 4,899,844 A | 2/1990 | Katahara et al. | 181/106 |
| 4,951,267 A | * 8/1990 | Chang et al. | 367/31 |
| 5,027,331 A | 6/1991 | Winbow et al. | 367/75 |
| 5,044,461 A | 9/1991 | Aronstam | 1/40 |
| 5,063,542 A | 11/1991 | Petermann et al. | 367/166 |
| 5,170,018 A | 12/1992 | Potier | |
| 5,229,553 A | 7/1993 | Lester et al. | 181/102 |
| 5,229,939 A | 7/1993 | Scheibner et al. | 364/422 |
| 5,265,067 A | 11/1993 | Chang | 367/31 |
| 5,357,481 A | 10/1994 | Lester et al. | 367/31 |
| 5,387,767 A | 2/1995 | Aron et al. | 367/25 |
| 5,398,215 A | 3/1995 | Sinha et al. | 367/31 |
| 5,475,650 A | 12/1995 | Sinha et al. | 367/31 |
| 5,510,582 A | 4/1996 | Birchak et al. | 181/102 |
| 5,521,882 A | 5/1996 | D'Angelo et al. | 367/32 |
| 5,544,127 A | 8/1996 | Winkler | 367/27 |
| 5,644,186 A | 7/1997 | Birchak et al. | 310/337 |
| 5,728,978 A | 3/1998 | Roberts et al. | 1/40 |
| 5,780,784 A | 7/1998 | Robbins | 181/102 |
| 5,796,677 A | 8/1998 | Kostek et al. | 367/25 |

FOREIGN PATENT DOCUMENTS

| | | | |
|---|---|---|---|
| EP | 0 388 316 | 3/1990 | |
| EP | 0 552 833 A1 | 7/1993 | G01V/1/40 |
| EP | 0 660 136 A2 | 6/1995 | G01V/1/48 |
| EP | 0 671 547 A1 | 9/1995 | |
| EP | 0 679 910 A2 | 11/1995 | G01V/1/44 |
| EP | 0 747 732 A2 | 12/1996 | |
| EP | 0 778 473 A2 | 6/1997 | G01V/1/52 |
| FR | 2138336 | 5/1971 | |
| FR | 2199595 | 9/1972 | |
| GB | 1 534 854 | 12/1978 | G01V/1/40 |
| GB | 2 071 847 A | 9/1981 | G01V/1/40 |
| GB | 2 165 356 A | 4/1986 | G01V/1/40 |
| GB | 2 266 372 A | 10/1993 | G01V/1/40 |
| WO | 93/07512 | 4/1993 | |
| WO | WO 93/15421 | 8/1993 | |
| WO | WO 94/10587 | 5/1994 | |
| WO | WO 95/14845 | 6/1995 | |
| WO | 98/05981 | 2/1998 | |

OTHER PUBLICATIONS

Nakkan, E. et al., "Characteristics of Drill Bit generated noise," SPWLA 31st Annual Logging Symposium, Jun. 24–27, 1990. Paper X, pp. 1–11.

Cheng, C. H., et al., "Elastic wave propagation in a fluid–filled borehole and synthetic acoustic logs," Geophysics, vol. 46, No. 7 (Jul. 1981), pp. 1042–1053.

Cheng, C. H. et al. "Determination of in situ attenuation from full waveform acoustic logs," Journal of Geophysical Research, vol. 87, No. B7, pp. 5477–5484, Jul. 10, 1982.

Paillet, F. L., "Predicting the frequency content of acoustic waveforms obtained in boreholes," SPWLA 22nd Annual Logging Symposium, Jun. 23–26, 1981, paper SS, pp. 1–29.

Peterson, E. W., "Acoustic wave propagation along a fluid–filled cylinder," Journal of Applied Physics, vol. 45, No. 8 (Aug. 1974), pp. 3340–3350.

Wuenschel, P. C., "Seismogram synthesis including multiples and transmission coefficients," Geophysics, vol. 25, No. 1 (Feb. 1960), pp. 106–129.

Arditty, P. C., et al., "Characterization of fractured hydrocarbon reservoirs using the EVA acoustic logging tool," The Log Analyst, May–Jun. 1991, pp. 215–232.

Aron, J. et al. "Sonic Compressional Measurements While Drilling," SPWLA 35th Annual Logging Symposium, Jun. 19–22, 1994, pp. 1–17.

Chang, S.K., et al. "A Study of sonic logging in a cased borehole," SPE 11034 (57th Annual Fall Technical Conference and Exhibition, New Orleans, Sep. 26–29, 1982, pp. 1–7.

Esmersoy, C. et al., "Fracture and Stress Evaluation Using Dipole–Shear Anisotropy Logs," SPWLA 36th Annual Logging Symposium, Jun. 26–29, 1995, Paper J, pp. 1–12.

Fortin, J.P. et al, "Reflection imaging around a well with the EVA full–waveform tool," Log Analyst, May–Jun. 1991, pp. 271–278.

Harrison, A.R. et al., "Acquistion and analysis of sonic waveforms from a borehole monopole and dipole source for the determination of compressional and shear speeds and their relation to rock mechanical properties and surface seismic data," SPE 20577 (65th annual technical conference and exhibition, New Orleans, 1990), pp. 267–282.

Kokesh, F. P. et al., "Geometrical factors in sonic logging," Geophysics, vol. 24, No. 1 (Feb. 1959), pp. 64–76.

Kokesh, F. P. et al., "A new approach to sonic logging and other acoustic measurements," SPE 30th Annual Fall Meeting, Houston, 1964.

Minear, J. et al., "Compressional Slowness Measurements While Drilling," SPWLA 36th Annual Logging Symposium, Jun. 26–29, 1995, Article VV, pp. 1–12.

Morris, C. F. et al., "A new sonic array tool for full waveform logging," SPE 13285 (59th Annual Technical Conference and Exhibition, Houston, 1984).

Smith, M. L. et al., "The Amoco array sonic logger," The Log Analyist, May–Jun. 1991, pp. 201–214.

Williams, D. M. et al., "The Long Spaced Acoustic Logging Tool," SPWLA 25th Annual Logging Symposim, Jun. 10–13, 1984, pp. 1–16.

Zemanek, J. et al., "Continuous Acoustic Shear Wave Logging," SPWLA 25th Annual Logging Symposium, Jun. 10–13, 1984, pp. 1–14.

Block, L. V. et al., "Velocity analysis of multi–receiver full–waveform acoustic–logging data in open and cased holes," Log Analyst, May–Jun. 1991, pp. 188–200.

Coppens, F. et al., "Application of the intercept time method to full wave form acoustic data," First Break, vol. 13, No. 1, Jan. 1995, pp. 11–20.

Dillon, P. B. et al., "On timing the VSP first arrival," Geophysical Prospecting 33, pp. 1174–1194, 1985.

Douze, E. J. et al., Statistics of semblance, Geophysics, vol. 44, No. 12 (Dec. 1979), pp. 1999–2003.

Gelchinsky, B., "Automatic picking of first arrivals and parametrization of traveltime curves," Geophysical Prospecting, 31, pp. 915–928, 1983.

Haldorsen, J. B. U. et al., "Supression of high–energy noise using an alternative stacking procedure," Geophysics, vol. 54, No. 2 (Feb. 1989); pp. 181–190.

Hsu, K. et al., "Application of the maximum–likelihood method (MLM) for sonic velocity logging," Geophysics, vol. 51, No. 3 (Mar. 1986); pp. 780–787.

Kanasewich, E. R., et al., "Nth–root stack nonlinear multichannel filter," Geophysics, vol. 38, No. 2 (Apr. 1973), pp. 327–338.

Kimball, C. et al., "Semblance processing of borehole acoustic array data," Geophysics, vol. 49, No. 3 (Mar. 1984), pp. 274–281.

Kurkjian, A. L. et al., "Slowness estimation from sonic logging waveforms," Geoexploration, 27 (1991), pp. 215–256.

Mari, J. L. et al., "An artificial intelligence approach for the picking of waves on full–waveform acoustic data," Proceedings of the Conference on Artificial Intelligence in Petroleum Exploration and Production, Houston, Texas 1992, pp. 211–219.

Mari, J. L et al.,"Slowness and Delay in Acoustic Logging," SPWLA 36th Annual Logging Symposium, Jun. 26–29, 1995, pp. 1–11.

McFadden, P. L. et al, "The Nth–root stack: Theory, applications, and examples," Geophysics, vol. 51, No. 10 (Oct. 1986), pp. 1879–1892.

Willis, M. E. et al., "Automatic P and S velocity determination from full waveform digital acoustic logs," Geophysics, vol. 48, No. 12 (Dec. 1983), pp. 1631–1644.

ANSI S1.20–1988 (ASA 75–1988) (Revision of ANSI S1.20–1972), "Procedure for calibration of underwater electroacoustic transducers", pp. cover–38.

Bobber, R. J., "General Reciprocity parameter," Journal of Acoustical Society of America, vol. 39, No. 4 (1966), pp. 680–687.

Goetz,J. F. et al., "An investigation into discrepancies between sonic log and seismic check spot velocities," Journal of Australian Petroleum Exploration Association, pp. 131–141, 1979.

Ellis, Darwin V., "Well Logging for Earth Scientists", Elsevier Science Publishing Co., New York, New York, 1987, pp. 339–437.

Anderson, Herbert L. (Editor in Chief), A Physicist's Desk Reference, The Second Edition of Physics Vade Mecum, American Institute of Physics, New York, New York, 1989, Chapter 2.00.

* cited by examiner

P represents compressional wave
S represents shear wave

METHOD AND APPARATUS FOR ACOUSTIC LOGGING

FIELD OF THE INVENTION

This invention relates generally to a method and apparatus utilized in hydrocarbon exploration. More specifically, the invention relates to the utilization of acoustic sources and receivers to determine acoustic properties of geologic formations as a logging tool traverses them, be it a wireline logging tool or a logging while drilling tool. More particularly, the present invention is directed to methods of and apparatus for determining certain acoustic velocities characteristic of the pertinent geologic formations.

BACKGROUND OF THE INVENTION

Geologists and geophysicists are interested in the characteristics of the formations encountered by a drill bit as it is drilling a well for the production of hydrocarbons from the earth. Such information is useful in determining the correctness of the geophysical data used to choose the drilling location and in choosing subsequent drilling locations. In horizontal drilling, such information can be useful in determining the location of the drill bit and the direction that drilling should follow.

Such information can be derived in a number of ways. For example, cuttings from the mud returned from the drill bit location can be analyzed or a core can be bored along the entire length of the borehole. Alternatively, the drill bit can be withdrawn from the borehole and a "wireline logging tool" can be lowered into the borehole to take measurements. In still another approach, called "measurement while drilling" ("MWD") or "logging while drilling" ("LWD") tools make measurements in the borehole while the drill bit is working. There are a wide variety of logging tools, including resistivity tools, density tools, sonic or acoustic tools, and imaging tools.

An acoustic logging tool collects acoustic data regarding underground formations. The purpose of such a tool is to measure the "interval transit time" or the amount of time required for acoustic energy to travel a unit distance in a formation. In simple terms, this is accomplished by transmitting acoustic energy into the formation at one location and measuring the time that it takes for the acoustic energy to travel to a second location or past several locations. The measurement is complicated by the fact that the tool is roughly in the middle of a borehole of unknown diameter and is surrounded by mud. Further, the formation along the borehole may have been disturbed by the action of the drill bit and may no longer have the same acoustic characteristics as the undisturbed formation.

SUMMARY OF THE INVENTION

In general, in one aspect, the invention features a logging-while-drilling acoustic logging tool comprising one or more acoustic transmitters and one or more acoustic receivers. One or more elements of a set comprising the acoustic receivers and the acoustic transmitters are spaced radially apart from one or more of the remaining elements of the set.

Implementations of the invention may include one or more of the following. The tool may include a transmit module coupled to the acoustic transmitters, a data acquisition module coupled to the acoustic receivers, and a transmitter trigger signal coupled to the transmit module and to the data acquisition module. The transmit module may be configured to initiate transmission via the acoustic transmitters and the data acquisition module may be configured to initiate data acquisition via the acoustic receivers.

In general, in another aspect, the invention features a logging-while-drilling acoustic logging tool comprising a multipole-capable acoustic source.

Implementations of the invention may include one or more of the following. The multipole-capable acoustic source may comprise one or more acoustic transmitters.

In general, in another aspect, the invention features an acoustic logging tool comprising a multipole capable acoustic source. The source comprises one or more acoustic transmitters. Each acoustic transmitter is configured to have a transmission direction. An acoustic transmitter is paired with another acoustic transmitter having an azimuthally opposite transmission direction.

Implementations of the invention include one or more of the following. The acoustic logging tool may comprise a transmitter module coupled to the acoustic transmitters. The transmitter module may be configured to fire the acoustic transmitters. The transmitter module may be configured to fire each acoustic transmitter. One or more of the acoustic transmitters may be configured to transmit acoustic energy at one or more selectable frequencies. The transmitter module may be configured to control frequency content of the acoustic energy transmitted by one or more acoustic transmitters. The transmitter module may be configured to control timing of the acoustic energy transmitted by one or more acoustic transmitters. The transmitter module may be configured to cause one of the acoustic transmitters to transmit acoustic energy and at least one other acoustic transmitter to transmit acoustic energy with a controlled time delay or phase shift relative to the one acoustic transmitter. The transmitter module may be configured to control magnitude of the acoustic energy transmitted by one or more acoustic transmitters.

In general, in another aspect, the invention features a logging-while-drilling acoustic logging tool comprising a multipole-capable acoustic receiver. The logging-while-drilling acoustic logging tool may further comprise a multipole-capable acoustic source.

In general, in another aspect, the invention features an acoustic logging tool comprising a multipole capable acoustic receiver, the receiver comprising one or more acoustic receivers. Each acoustic receiver is configured to have a receive direction. An acoustic receiver is paired with another acoustic receiver having an azimuthally different receive direction.

Implementations of the invention include one or more of the following. The acoustic logging tool may comprise one or more sample-and-hold amplifiers, each sample-and-hold amplifier configured to sample and hold a signal originating in the acoustic receivers and conditioned by one or more conditioning components. The one or more sample-and-hold amplifiers may sample substantially simultaneously. The acoustic logging fool may comprise a processor. The conditioning components may comprise an adjustable high-pass filter having a cutoff frequency adjustable under control of the processor. The processor control of the cutoff frequency may be adaptive. The conditioning components may comprise an adjustable amplifier having a gain adjustable under control of the processor. The adjustable amplifier may be configured to be adjusted separately for one or more receiver channels. The processor control of the adjustable amplifier may be adaptive. The conditioning components may comprise a low pass filter. The conditioning components may comprise a pre-amplifier interfaced to the receivers. The conditioning components may comprise an amplifier. The acoustic logging tool may comprise an analog-to-digital converter for converting the analog signals held by the one or more sample-and-holds to a digital signal. The digital signal may be coupled to the processor. The acoustic logging tool may comprise a multiplexer for selecting, based on an address, one of the analog signals held by the one or more sample-and-holds to couple to the analog-to-digital converter. The acoustic logging tool may comprise a counter for producing the address and a clock. The clock may drive the counter and the analog-to-digital converter. The counter may have a sample-and-hold output configured to cause the sample-and-holds to sample. The counter may have a processor output configured to inform the processor that the counter had completed a counter cycle. The acoustic logging tool may comprise a multipole-capable acoustic source. The acoustic logging tool may comprise one or more analog to digital converters, each analog to digital converter configured to sample a signal originating in one of the acoustic receivers and conditioned by one or more conditioning components. The one or more analog to digital converters may sample substantially simultaneously.

The acoustic logging tool may comprise one or more multiplexers and one or more analog to digital converters. Each analog to digital converter may be configured to sample signals originating in the acoustic receivers, conditioned by one or more conditioning components and multiplexed by one or more multiplexers.

In general, in another aspect, the invention features a logging-while-drilling acoustic logging tool comprising a tool housing, a first acoustic transmitter configured to transmit acoustic energy generally in a first direction relative to the tool housing, a second acoustic transmitter configured to transmit acoustic energy generally in a second direction relative to the tool housing, a processor configured to make acoustic measurements in the first direction using any combination of transmitters and a receiver. The processor is further configured to male acoustic measurements in the second direction using any combination of transmitters and receiver.

In general, in another aspect, the invention features a logging-while-drilling tool for measuring acoustic velocity in any geologic formation comprising an acoustic transmitter configured to create and sustain multiple types of acoustic waves in the geologic formation.

In general, in another aspect, the invention features an acoustic logging tool comprising a transmit module configured to cause one or more acoustic transmitters to transmit acoustic energy. The tool includes a data acquisition module configured to accept signals from one or more acoustic receivers, convert the signals to unprocessed data, and process the unprocessed data to produce processed data. The tool includes a data storage module configured to store the processed data.

Implementations of the invention may include one or more of the following. The data storage module may be configured to store the unprocessed data. The data storage module may be configured to store processed and unprocessed data. The data storage module may be configured to store processed and unprocessed data for an entire mission. The data storage module may be configured to compress the processed data. The data storage module may adaptively choose a compression algorithm to compress the processed data. The data storage module may be configured to apply error correction code to the processed data before storage. The data storage module may adaptively choose an error correction coding algorithm to apply error correction code to the processed data before storage.

In general, in another aspect, the invention features a logging-while-drilling acoustic logging tool comprising a processor, and a computer-readable medium coupled to the processor having computer-readable program code embodied thereon for controlling the operation of the logging-while-drilling acoustic tool. The tool comprises two or more radially offset transmitters.

Implementations of the invention may include one or more of the following. The computer-readable program code may comprise computer-readable code for causing the processor to compute one or more formation acoustic velocities using the collected data. The computer -readable program code may include computer-readable code for causing the processor to store the computed one or more acoustic velocities in the data memory. The computer-readable program code may include computer-readable code for causing the processor to provide the collected data to a communication device configured to transmit the collected data. The computer-readable program code may comprise computer-readable code for causing the processor to provide the computed one or more acoustic velocities to a communication device configured to transmit the computed velocity.

In general, in another aspect, the invention features a method for acoustic logging-while-drilling using an acoustic logging tool comprising a processor, one or more transmitters under processor control and one or more receivers under processor control, the method comprising spacing one or more elements of a set comprising the transmitters and the receivers radially apart from one or more of the remaining elements of the set, firing the one or more transmitters, and collecting data from the receivers.

Implementations of the invention may include one or more of the following. The method may include computing one or more formation velocities from the collected data.

The method may include storing the computed one or more formation velocities. The method may include storing the collected data.

In general, in another aspect, the invention features a method for acoustic logging using an acoustic logging tool comprising a processor, a transmitter under processor control and a receiver under processor control, the method being accomplished by the processor. The method comprises transmitting acoustic energy into a formation using the transmitter, controlling the azimuthal profile of the acoustic wave emitted into the formation, and receiving acoustic energy from the formation using the receiver.

Implementations of the invention may include one or more of the following. The method may comprise processing the received acoustic energy using the processor to produce processed data. The method may comprise adaptively processing the received acoustic energy using the processor to produce processed data. Adaptively processing may comprise applying decision logic to determine which of one or more acoustic signal processing algorithms to execute. The method may comprise compressing the processed data. Compressing may comprise adaptively compressing the processed data. The method may comprise error correction coding the processed data. Error correction coding may comprise adaptively error correction coding the processed data.

In general, in another aspect, the invention features a logging-while-drilling acoustic logging tool comprising a tool housing, a first acoustic receiver configured to receive acoustic energy generally from the first direction relative to the tool housing, and a second acoustic receiver configured to receive acoustic energy generally from the second direction relative to the tool housing. A processor is configured to make acoustic measurements in the first direction using any combination of a transmitter and receivers. The processor is further configured to make acoustic measurements in the second direction using any combination of transmitter and receivers.

In general, in another aspect, the invention features a logging-while-drilling acoustic logging tool comprising a processor, a computer-readable medium coupled to the processor having computer-readable program code embodied thereon for controlling the operation of the logging-while-drilling acoustic tool; and two or more radially offset receivers.

Implementations of the invention may include one or more of the following. The computer-readable program code may comprise computer-readable code for causing the processor to compute one or more formation acoustic velocities using the collected data. The computer-readable program code may comprise computer-readable code for causing the processor to store the computed one or more acoustic velocities in the data memory. The computer-readable program code may comprise computer-readable code for causing the processor to provide the collected data to a communication device configured to transmit the collected data. The computer-readable program code may comprise computer-readable code for causing the processor to provide the computed one or more acoustic velocities to a communication device configured to transmit the computed velocity.

DESCRIPTION OF THE PREFERRED EMBODIMENTS

Figure 1:
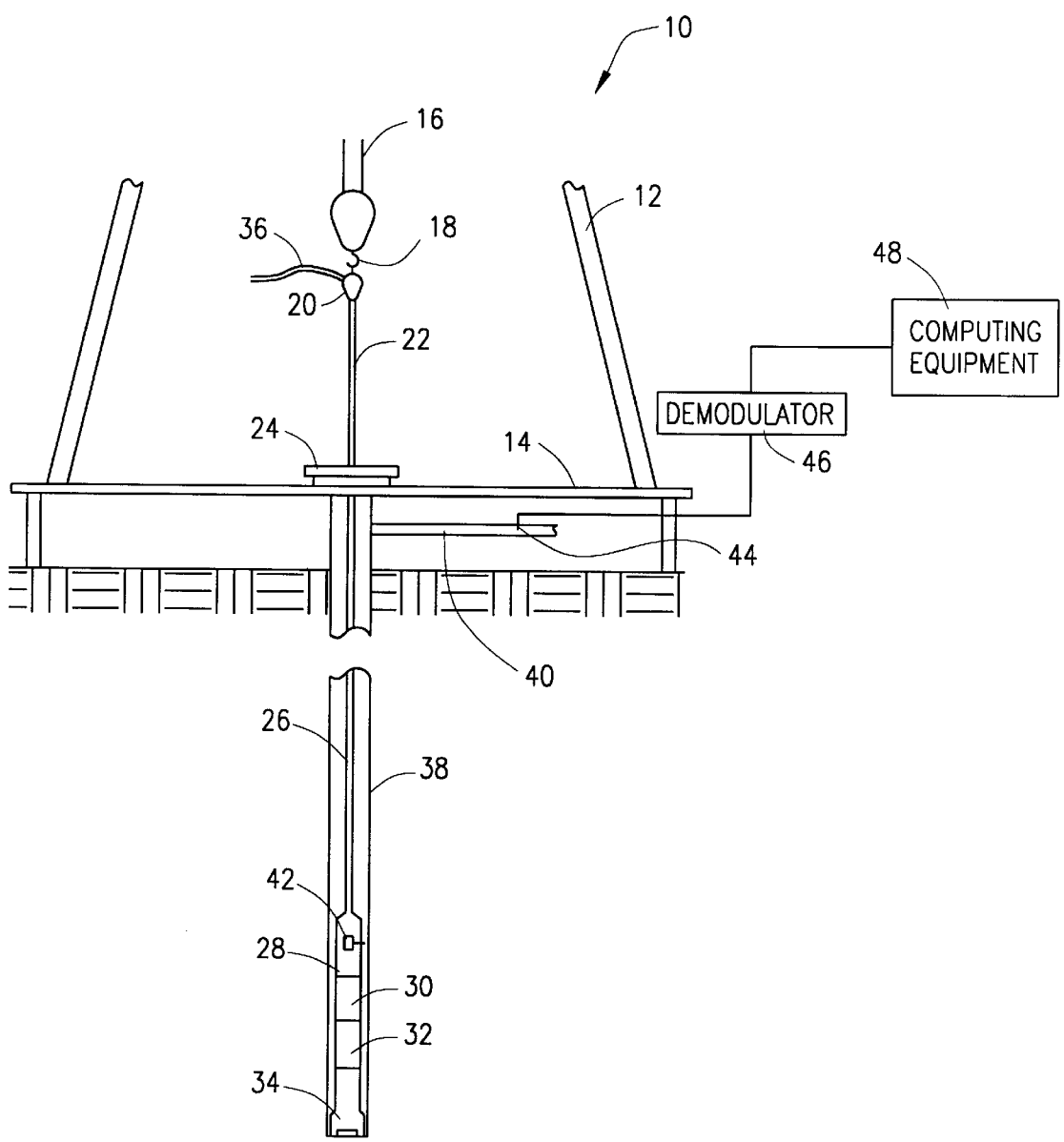
FIG. 1 is an illustration of a logging while drilling system incorporating an acoustic logging while drilling tool of the present invention.

As shown in FIG. 1, a drilling rig 10 (simplified to exclude items not important to this application) comprises a derrick 12, derrick floor 14, draw works 16, hook 18, swivel 20, kelly joint 22, rotary table 24, drillstring 26, drill collar 28, LWD tool 30, LWD acoustic logging tool 32 and drill bit 34. Mud is injected into the swivel by a mud supply line 36. The mud travels through the kelly joint 22, drillstring 26, drill collars 28, and LWD tools 30 and 32 and exits through ports in the drill bit 34. The mud then flows up the borehole 38. A mud return line 40 returns mud from the borehole 38 and circulates it to a mud pit (not shown) and back to the mud supply line 36.

The data collected by the LWD tools 30 and 32 is returned to the surface for analysis by telemetry transmitted through the drilling mud. A telemetry transmitter 42 located in a drill collar or in one of the LWD tools collects data from the LWD tools and modulates the data onto a carrier which can be transmitted through the mud. A telemetry sensor 44 on the surface detects the telemetry and returns it to a demodulator 46. The demodulator 46 demodulates the data and provides it to computing equipment 48 where the data is analyzed to extract useful geological information.

When an acoustic plane wave crosses the boundary between two media with different acoustic characteristics, part of the wave will be reflected and part of the wave will be transmitted through the boundary.

Figure 2:
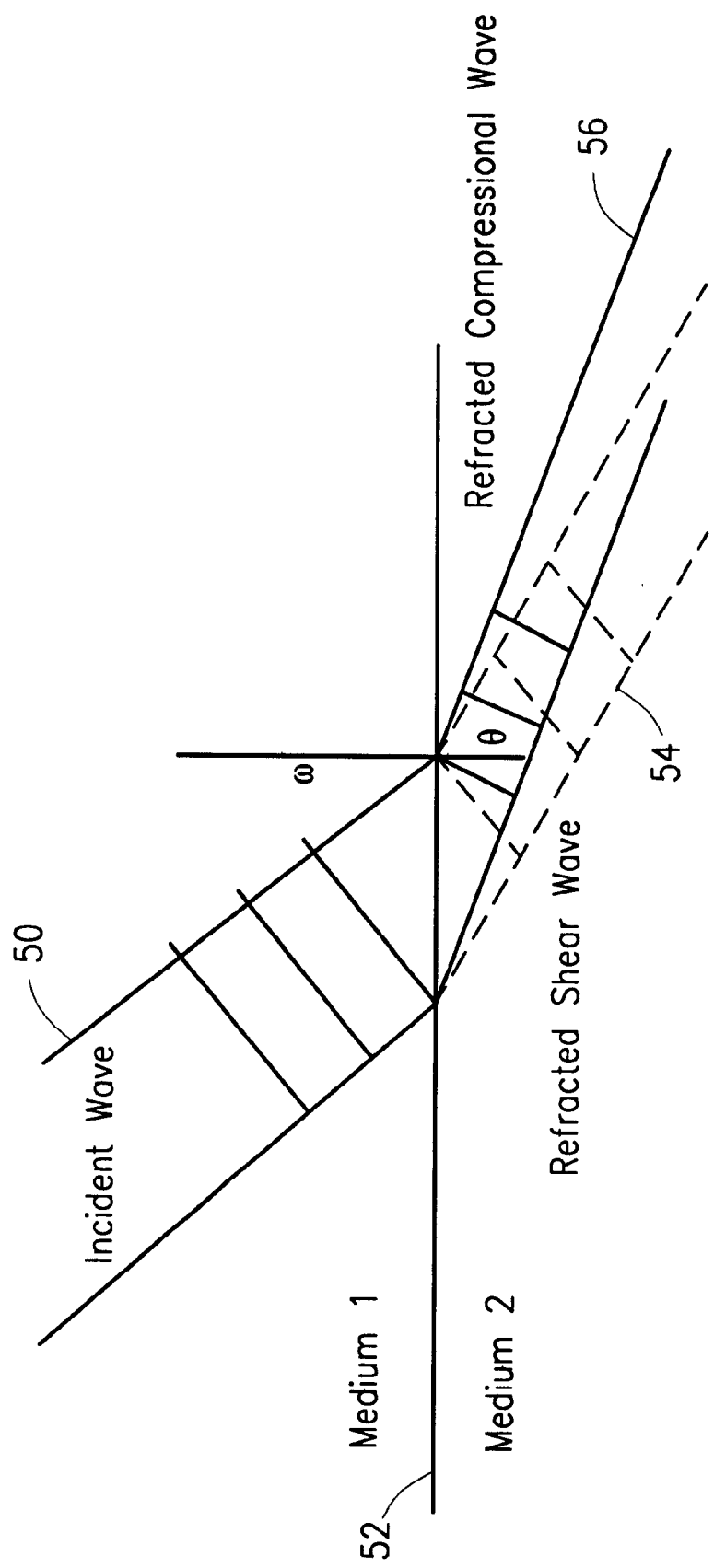
FIG. 2 is an illustration of the generation of acoustic waves when an incident wave intersects the interface of two media with different acoustic properties.

The reflection and refraction of acoustic waves can be visualized by use of Huygen's principle. FIG. 2 shows the interface of two media that are characterized by two different densities, and compressional and shear velocities, which are different in the two regions. In FIG. 2, an incident wave 50 arrives at the interface 52 between medium 1 and medium 2 at an angle ω off perpendicular to the interface between medium 1 and medium 2. Two acoustic waves are generated in medium 2: a refracted shear wave 54 and a refracted compressional wave 56.

Based on the law of refraction (Snell's law) it is known that if the angle of incidence becomes large enough, then the refracted wave will travel parallel to the interface surface. This critical incidence angle $\omega_{crit}$, is given (for the compressional wave with velocities $v_{p1}$ and $v_{p2}$ in the two media) by $$\sin \omega_{crit} = \frac{v_{p1}}{v_{p2}}$$

Waves that are critically refracted and travel along the boundary are referred to as "head waves". As they travel along the interface, they radiate energy back into the initial medium. It is this phenomenon which allows detection, by an acoustic device positioned in the borehole, of acoustic energy which has propagated primarily in the formation.

A very important parameter in the field of borehole acoustics is the slowness, defined as the inverse of wave velocity.

If the slowness is independent of frequency, then the wave is said to be "non-dispersive". That is, all frequencies travel at the same slowness so the shape of the arrival will not change with transmitter to receiver offset. If the slowness does depend upon frequency, then the wave shape changes, typically broadening in time and narrowing in frequency, or disperses, with increasing offset from the source. Theoretically, in sonic logging applications, the modes are dispersive in nature; however, this dispersion is often difficult to see in the waveforms. Part of the problem is that dispersion is difficult to observe over the short array aperture of a sonic tool (typically only about one wavelength long).

If the slowness of a mode is real-valued, then the mode is said to be "perfectly trapped", or "guided". In this case, the wave does not lose energy as it propagates. If the slowness is complex-valued, then there is an exponential decay with increasing transmitter to receiver offset and the mode is said to be "leaky".

The actual modes present in the fluid channel (borehole) can be divided into three sets: (1) the slightly dispersive Stoneley mode; (2) the strongly dispersive shear normal modes (or pseudo-Rayleigh modes in cylindrical boreholes); and (3) a similar series of dispersive compressional normal modes. It is well known to those skilled in the art that knowledge of three parameters, i.e. density, compressional velocity and shear velocity, can yield the physical parameters that can fully characterize the mechanical properties of the rock. The density measurement can be performed with several classical nuclear methods. The measurement of the compressional and shear velocity can only happen with acoustic means, i.e. through the calculation of acoustic velocities. In logging applications it is customary to discuss the subject in terms of "interval travel times", or "acoustic transit times", which is the reciprocal of the acoustic velocities. By definition the unit for the interval travel time is (velocity)–or slowness. In SI it would be s/m, or due to its rather small value for rocks and most material of interest $\mu$s/m. In most cases the quoted numbers are given in $\mu$s/ft.

Figure 3:
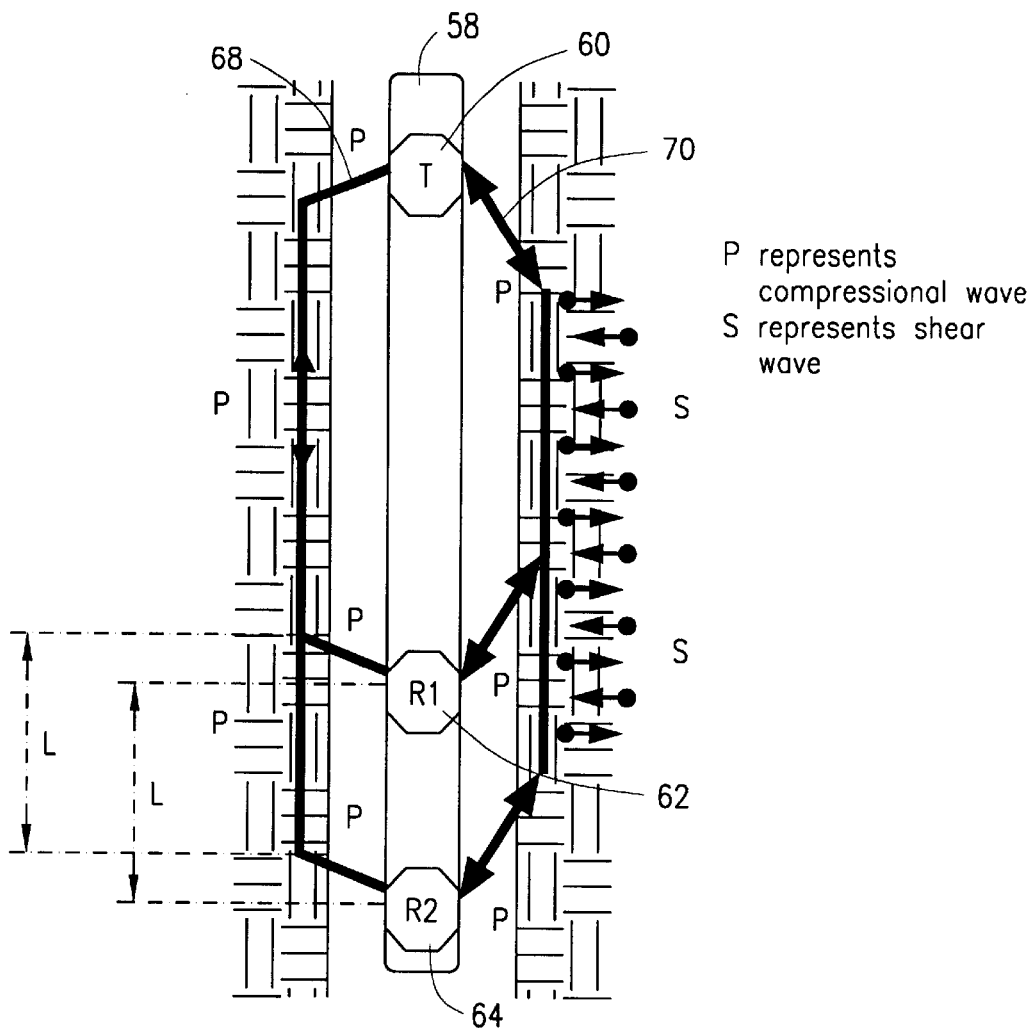
FIG. 3 is a representation of a prior art acoustic logging tool.

One of the classic forms for an acoustic tool 58 (well known to those skilled in the art) is the single transmitter-dual receiver tool, a schematic of which is shown in FIG. 3. In the figure the basic mode of propagation of the compressional (P or primary) and the shear (S or secondary) wave are also shown.

Figure 4:
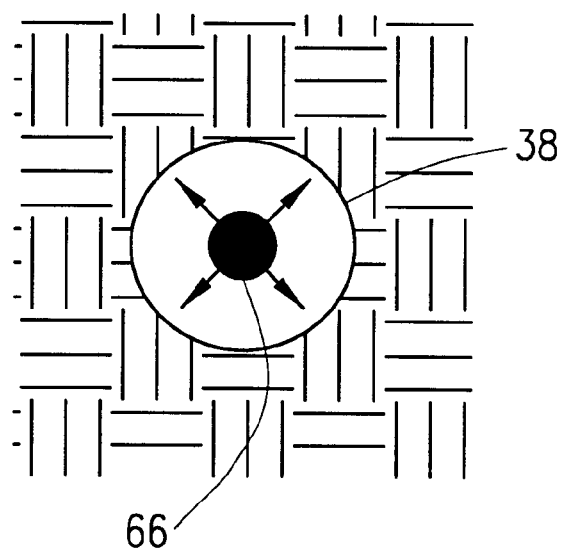
FIG. 4 is an illustration of the acoustic wave generated by a monopole source.
Figure 5:
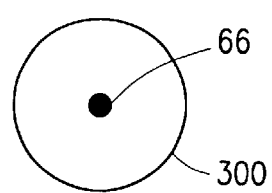
FIG. 5 is an illustration of the radiation pattern emitted from a monopole source.

The tool consists of an acoustic transmitter (T) 60. The tool also contains two receivers (R1 and R2) 62, 64 spaced apart at a distance L. The transmitter is typically designed as a ring or a cylinder aligned with the borehole axis so as to produce axisymmetric excitation of waves. Such a transmitter is called a monopole transmitter 66, as illustrated in FIG. 4. For this transmitter the wave excitation has the general shape shown in FIG. 4 and the radiation pattern 300 can in two dimensions be approximated by the form shown in FIG. 5. For the simple case of a fluid-filled borehole in a rock formation, there are essentially four types of acoustic waves that propagate: two head-waves and two guided waves. The P-wave 68 begins as a compressional wave in the borehole fluid, is critically refracted into the formation as a P wave and then is refracted back into the fluid as a compressional wave. The S wave 70 begins as a compressional wave in the borehole fluid, is critically refracted into the formation as an S wave and is refracted back into the fluid as a compressional wave. Another wave is the reflected conical wave, also called the pseudo-Rayleigh wave. It is a guided wave that decays radially away from the borehole wall in the solid and is oscillatory in the fluid. Another wave, called the Stoneley wave, is a slightly dispersed guided wave that propagates along the borehole wall. The amplitude of a Stoneley wave decays exponentially away from both sides of the fluid/rock interface. This wave is especially prominent when the receiver is placed close to the borehole wall (as in the case of an MWD sonic tool).

Figure 6:
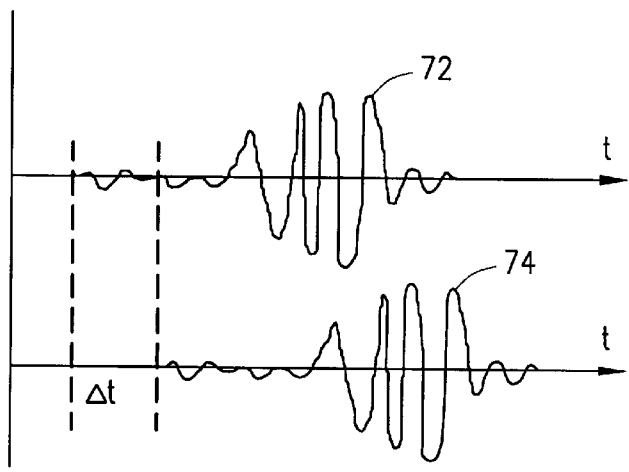
FIG. 6 is an illustration of the fundamental principle of acoustic velocity determination based on first arrival moveout between two receivers.

The classical $\Delta t$ measurement is illustrated in FIG. 6. Waveform 72 is a representation of the acoustic energy received at receiver R1 62 and waveform 74 is a representation of the acoustic energy received at receiver R2 64, with the time scale being the same for both waveforms. It is clear that the difference of arrival time of the compressional wave to the receivers R1 and R2 only depends on the distance between receivers (L) and on the compressional velocity of the formation ($v_p$). Simple physics dictates that $$\Delta t = \frac{L}{v_p}, \text{ or that}$$

$$\frac{1}{v_p} = \frac{\Delta t}{L}$$

In the classic acoustic tools, $\Delta t$ was calculated by estimating the time of first arrival at receivers R1 and R2 by utilizing simple threshold techniques on the analog signals representing the acoustic waves. This method is usually referred to as a "two-receiver moveout" method, as it estimates the velocity from the time difference (moveout) of a single wave arrival to two different receivers.

From the discussion above, it becomes clear that this simple formula for calculation of formation slowness depends on two key points: accurate determination of $\Delta t$, and symmetry of the tool/borehole/formation system. Taking advantage of symmetry is one way by which the other time components that will affect the arrival of the wave to the receiver (travel time in the mud, travel time down the borehole to the first receiver etc.) can be eliminated. Response of a dual-receiver acoustic device is generally adversely affected by non-uniform borehole size, sonde tilt, and gas-cut borehole fluid.

In order to eliminate most of the adverse effects of non-symmetric systems, several combinations of multi-transmitter, multi-receiver tools have been utilized for acoustic logging. Most of these devices are called "borehole compensated" since they eliminate the borehole size effect. Array tools also take advantage of advanced signal processing techniques, to accurately calculate $\Delta t$ or directly estimate slowness from the analysis of the full waveform.

As is well known to those skilled in the art, acoustically slow formations are those in which the shear wave velocity is lower than that of the acoustic wave velocity of the borehole fluid (drilling mud or water). In such formations, compressional or pressure wave energy generated in the borehole fluid column can not be critically refracted as mode converted shear wave along the borehole wall and radiate back into the borehole to be picked up by the receivers. Thus direct determination of shear wave velocity in slow formations is not possible with the classic acoustic tools that contain a monopole (axisymmetric) transmitter. There are two ways to estimate shear wave velocities in acoustically slow formations: first, a direct measurement by utilization of multipole sources; second, indirect estimation methods based on analysis of other wave components such as the tube (Stoneley) wave or the leaky compressional mode. The indirect methods are not very accurate and have many other limitations.

The most direct method of measuring the shear wave velocity of the formation is direct shear wave logging. This is achieved by using non-axisymmetric sources. Currently non-axisymmetric sources can be divided into two types: dipole and quadrupole sources. Dipole sources are usually provided in wireline by using a bender element or a movable cylinder.

Figure 7:
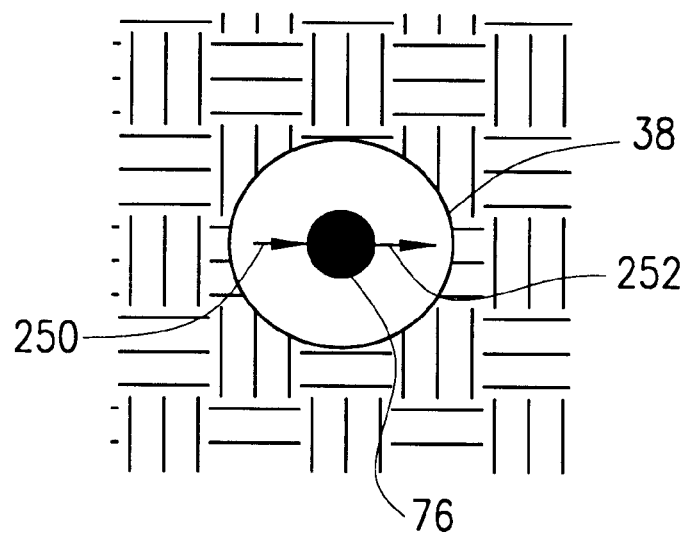
FIG. 7 is an illustration of the acoustic wave generated by a dipole source.
Figure 8:
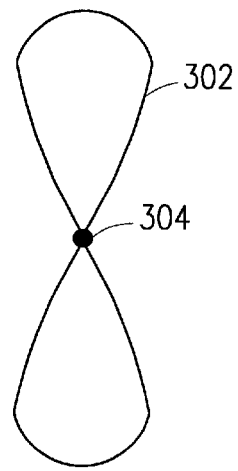
FIG. 8 is an illustration of the radiation pattern emitted from a dipole source.
Figure 9:
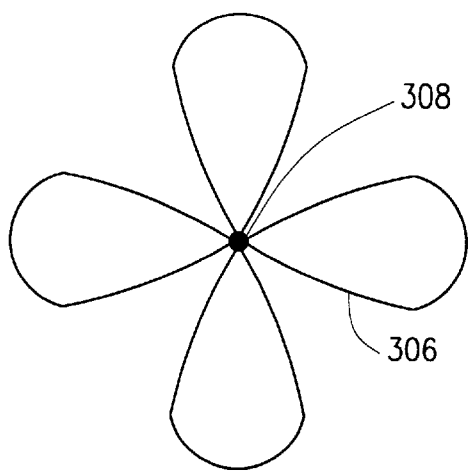
FIG. 9 is an illustration of the radiation pattern emitted from a quadrupole source.
Figure 10:
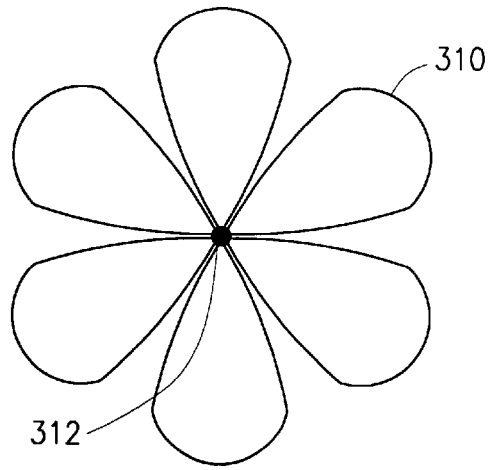
FIG. 10 is an illustration of the radiation pattern emitted from a sextupole source.

A dipole source 76 generates a positive displacement of the borehole fluid in one direction 250 and an equal but negative displacement in the opposite direction 252, as illustrated in FIG. 7. The radiation pattern 302 of the pressure generated in the borehole by a dipole source 304 is illustrated in FIG. 8. The radiation pattern of 306 a quadrupole source 308 is illustrated in FIG. 9. The radiation patterns for higher order multipole sources are similar. For example, the radiation pattern for a sextupole source is illustrated in FIG. 10.

In simple terms, the dipole transmitter emits asymmetric energy "pushing" on one side of the borehole and "pulling" on the other to generate a flexural wave in the formation/borehole interface. At low frequencies, this flexural wave travels down the borehole wall at the formation shear velocity. Dipole receivers can be located at the center of the tool/borehole and are sensitive to differential pressures thus detecting the flexural wave. Since the receivers are not sensitive to axially symmetric pressure fields, both the compressional and the Stoneley waves are suppressed, allowing the flexural wave to be accurately identified.

Figure 11:
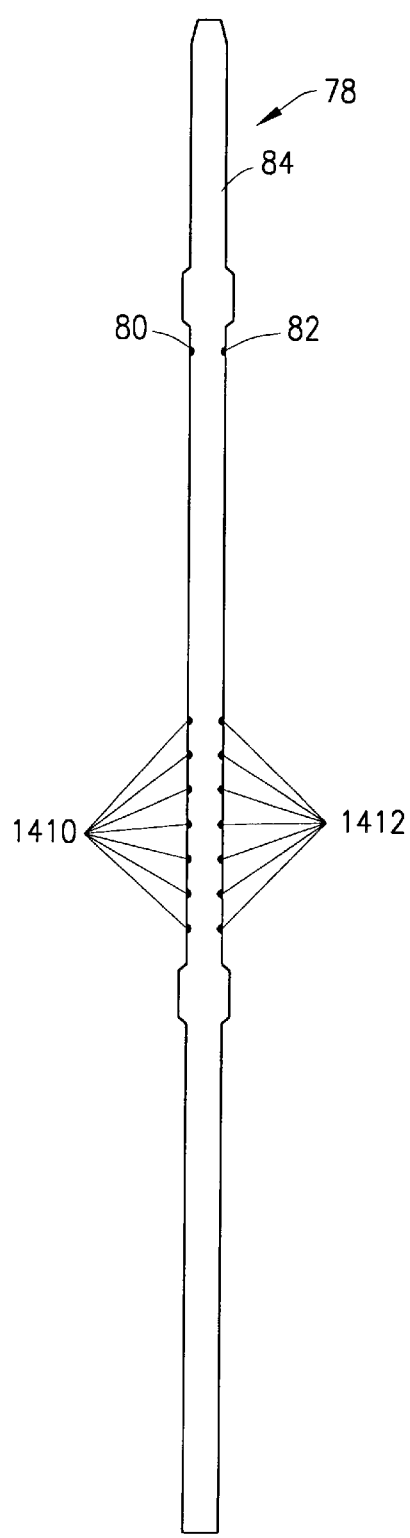
FIG. 11 is an illustration of an acoustic logging tool of the present invention with dipole transmitters and receivers.

Referring now to FIG. 11, the present invention is an LWD acoustic logging tool 78 with multipole-capable transmitters and multipole-capable receivers capable of generating and sustaining acoustic waves in a geologic formation. The multipole-capable transmitter consists of two or more transmitters 80 and 82 mounted in the drill collar 84 so that they direct their energy in substantially opposite directions. The frequency, magnitude and time-of-fire of the energy transmitted by each of the transmitters can be controlled as discussed below. Consequently, energy transmitted by transmitter 80 can be time-displaced with respect to the energy transmitted by transmitter 82 but with the same frequency and magnitude. The result is a simulated dipole transmitter. The two transmitters can also be fired synchronously to simulate a monopole transmitter. Further, the two transmitters can be fired in any combination of frequency, magnitude and timing desired to generate a variety of vibration modes in the formation.

The multipole-capable receiver is constructed, for example, as two rows of seven spaced receivers mounted in such a way that they are in diametrically opposed sides of the drill collar 84. Each receiver has its own data acquisition channel with adjustable gain and signal conditioning characteristics. Each receiver channel is sampled substantially simultaneously and each sample is converted into digital form. A digital signal processor inside the tool performs a variety of calculations using the sampled data including At calculations. The collected data and the calculated data are stored in the tool for later analysis and the calculated data is transmitted to the surface through mud telemetry as described above.

Figure 12:
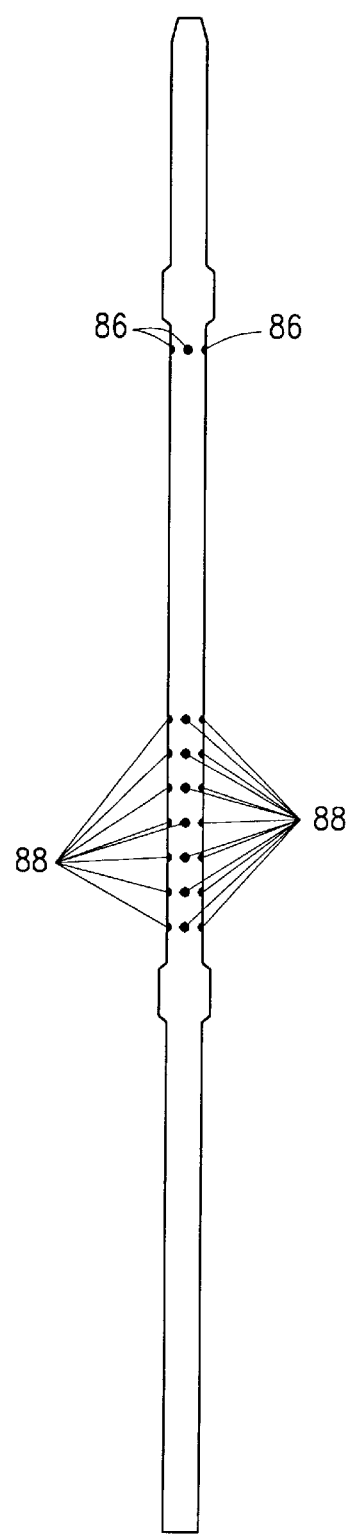
FIG. 12 is an illustration of an acoustic logging tool of the present invention with quadrupole transmitters and receivers.

The approach described above can be used to create tools with quadrupole, sextupole or any other multipole characteristic by increasing the number of transmitters and the number of receivers. For example, FIG. 12 illustrates a tool with a quadrupole-capable transmitter and a quadrupole-capable receiver. The tool includes four transmitters 86 (only three are shown) and four rows of seven receivers 88 (only three rows are shown). The transmitters and receivers can be manipulated as described above to create a quadrupole-capable transmitter and receiver set.

Figure 13:
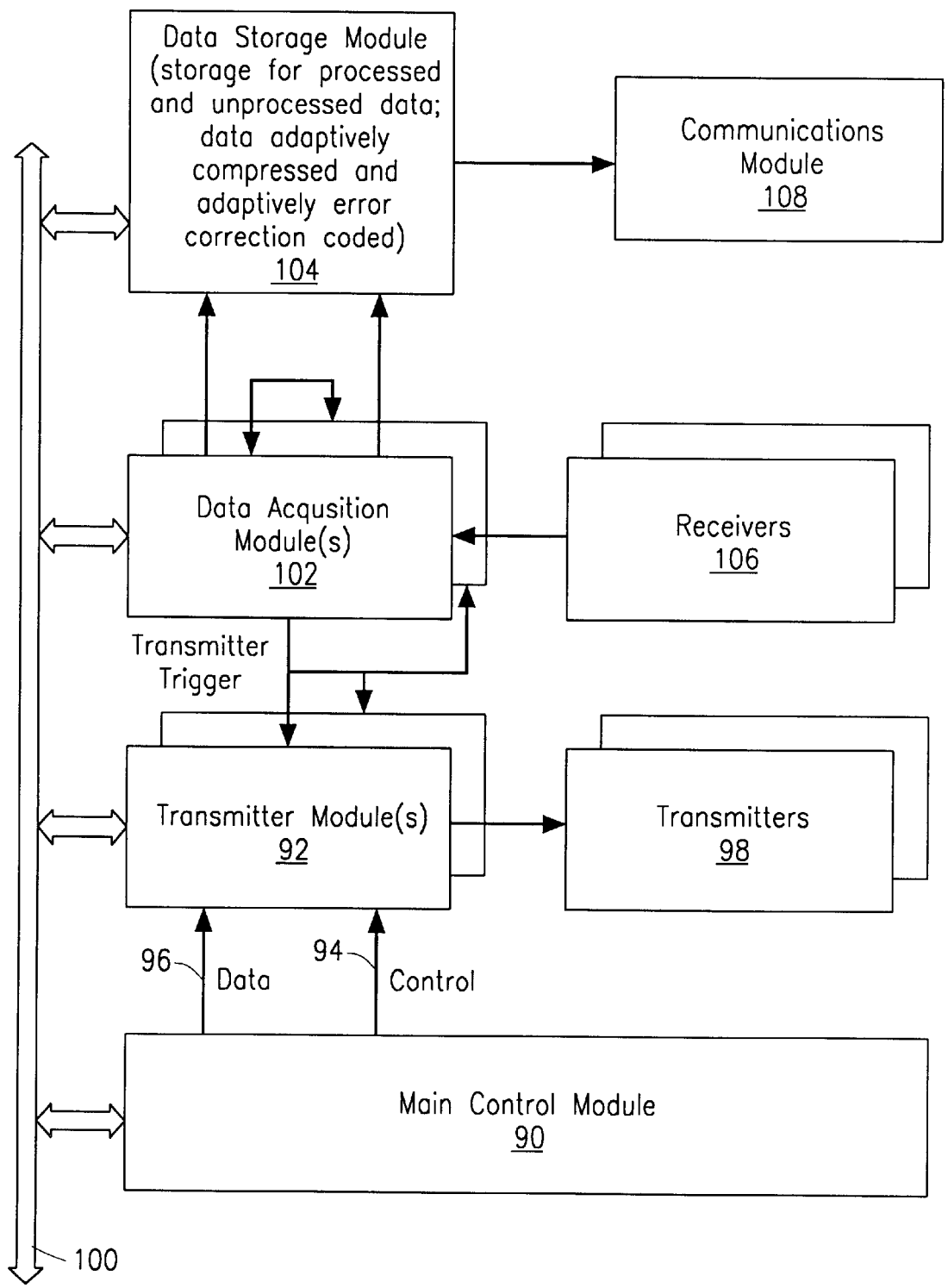
FIG. 13 is an overall block diagram of the electronics for the acoustic logging tool of the present invention.

A block diagram of the preferred electronics embodiment for the acoustic tool 78 is shown in FIG. 13. A Main Control Module (MCM) 90 contains a controller (such as a microprocessor, a micro-controller or a Digital Signal Processor) that is responsible for the initialization of the logging sequence. A Transmitter Module (TM) 92 is connected to the MCM 90 through a set of control 94 and data 96 lines. The TM is further connected to the transmitter 80 (or transmitters 80 and 82 for the preferred embodiment) (marked as block 98 in the figure). The MCM 90 is further connected preferably through a bus 100 to one or more Data Acquisition Modules 102 (DAQ) and the Data Storage Module 104 (DSM). The DAQ 102 is in turn connected to the receivers 106, to the TM 92 and to the DSM 104. If more than one DAQ modules are in the system they are preferably connected to each other through a control and data link. The DSM is connected to a Communications Module 108 (CM).

Figure 14:
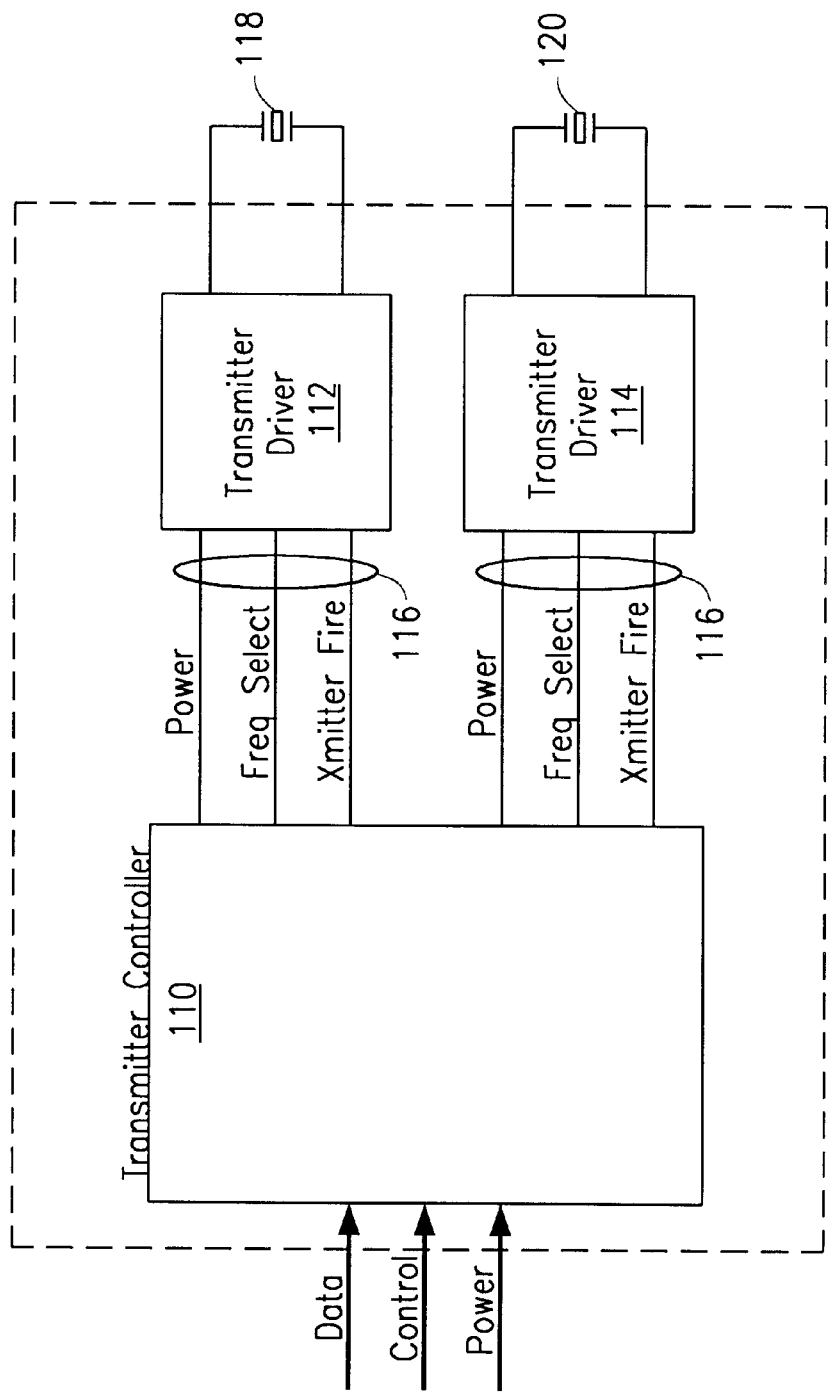
FIG. 14 is a block diagram of the transmitter module for the acoustic logging tool of the present invention.

Referring to FIG. 14 the TM is further comprised of a Transmitter Controller 110 (TC) and one or more Transmitter Drivers (TD) of which two are shown 112 and 114. The TC is connected to the TD through a set of power and control lines 116, which include but are not limited to power (could be high voltage), a frequency select line and a trigger (transmitter fire) line. Each TD is further connected to the acoustic transmitter 118 and 120. The frequency select line allows the transmitter to be fired with more than one frequency, selectable through a control signal such as the one presented by the frequency select line. It is well known to those skilled in the art that multiple frequency selection can be obtained either through switching of inductors, or through the use of a linear amplifier, or through the use of multiple sets of transmitters tuned to different frequencies.

In the preferred embodiment, a generalized sequence of operation would be the following: the MCM 90 determines that it is time to acquire data. Those skilled in the art will appreciate that such a determination can be time or depth based and can either be preprogrammed or be initiated upon request from an external source to the MCM. The MCM initializes the TM 92 and the DAQ 102 and transfers to them all pertinent information including but not limited to: transmitter waveform characteristics such as amplitude, frequency, and time of fire; receiver channel sequence such as time delay from transmission of waveform until initialization of receiver channel acquisition, and sampling frequency; receiver channel conditioning such as initial gain settings; processing information such as computational parameters required to estimate the slowness of the pertinent acoustic waves.

Figure 20:
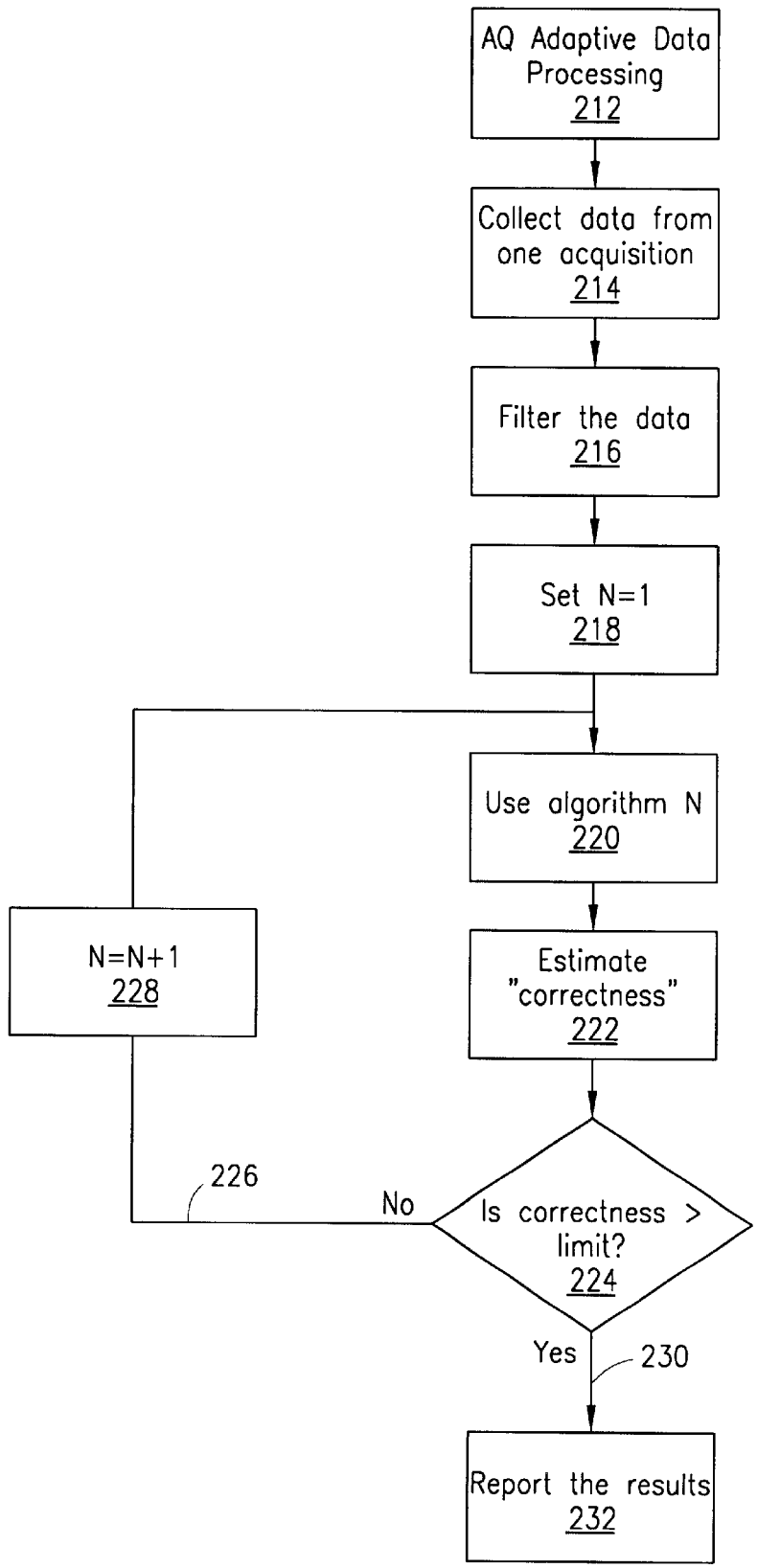
FIG. 20 is a flowchart for the adaptive data processing of the receiver data from the acoustic logging tool of the present invention.

The DAQ 102 triggers the TM 92. In the case where more than one DAQ 102 module is present, one of them, considered to be the master, triggers the rest of them. In the preferred embodiment there are two DAQ 102 modules. Upon triggering by the DAQ 102 the following actions take place. The TM 92 fires the transmitters 98 with the determined amplitude, frequency and time-of-fire delay between transmitters when more than one transmitter is fired. After an initial determined time delay (which could be zero) the DAQ 102 initiates the acquisition of acoustic waveforms from the receivers 106. The received signal is sampled substantially simultaneously in all channels and is conditioned through programmable signal conditioning as explained below when discussing FIG. 15. When the acquisition is complete the MCM 90 provides further instructions to the DAQ 102 through the bus 100 regarding data processing and storage options. The DAQ 102 processes the data through an adaptive processing algorithm (see description below in FIG. 20). Processed data are conveyed to the MCM 90 through the bus 100, so that they can be forwarded to the mud pulse telemetry system 42, and then transmitted to the surface.

The MCM 90 further instructs (through the bus 100) the DSM 104 to collect and store the data. The DSM through the bus 100 collects the data from the DAQ 102 and the MCM 90, and proceeds to compress, apply error-correction-code, and eventually store the data. Upon command the DSM 104 transmits the data to an external host through the CM 108.

Figure 15:
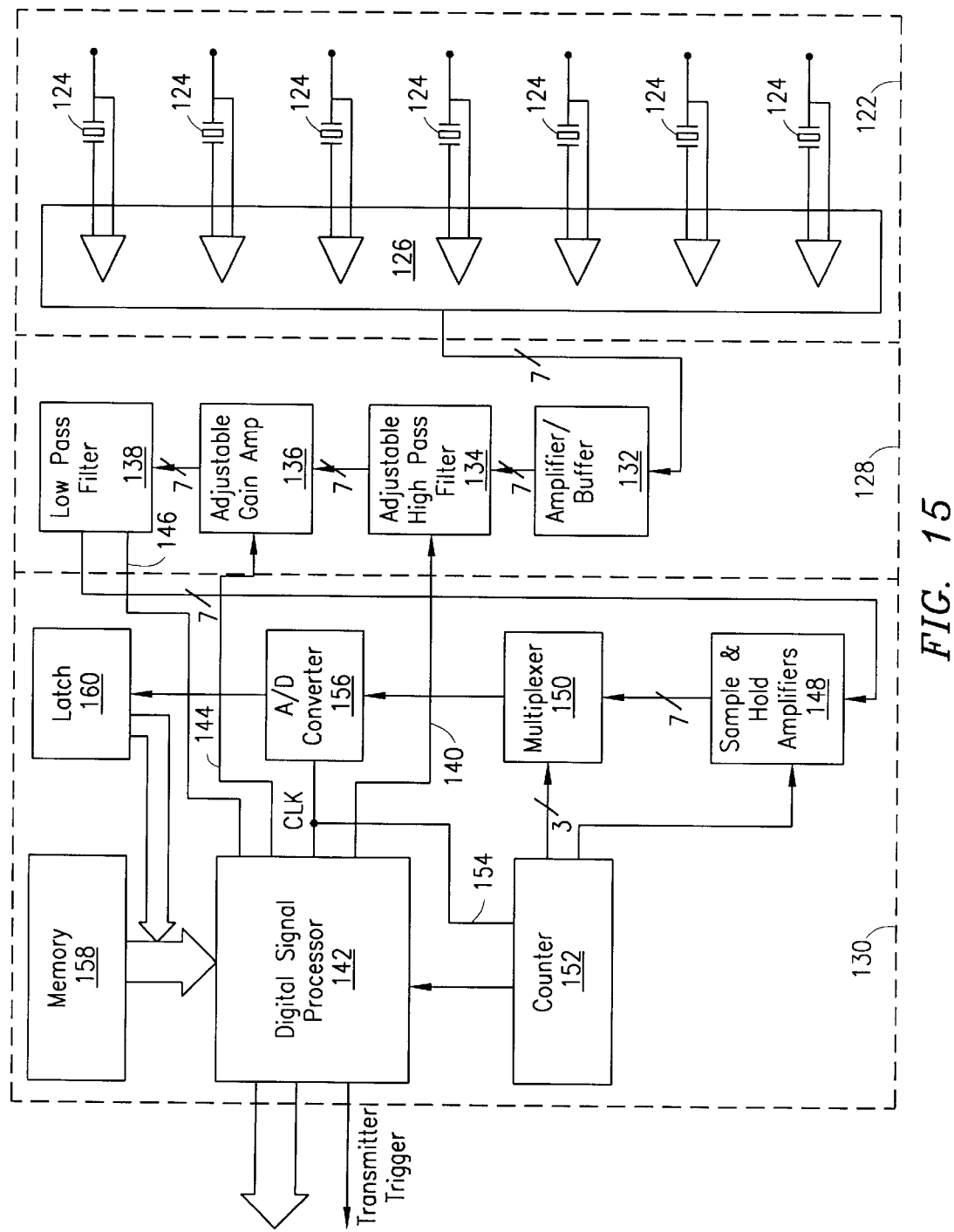
FIG. 15 is a block diagram of the data acquisition, conditioning and digitization electronics for the acoustic logging tool of the present invention.

Referring now to FIG. 15, it can be seen that in the preferred embodiment acoustic waves are received and processed in three stages. The first stage 122 contains the acoustic receivers 124 and their associated drive electronics 126, which in the preferred embodiment include a low impedance amplifier. Those skilled in the art will appreciate that other modes of pre-amplification can also be used, such as a charge pump. Any appropriate acoustically sensitive device such as piezoelectric elements, magnetostrictive elements, pressure transducers or accelerometers can construct the receivers 124. The second stage 128 contains the programmable signal conditioning. And finally the third stage 130 contains the electronics that accomplishes the substantially simultaneous acquisition of all the received channels.

Stage 128 contains, in order, an amplifier/buffer 132, an adjustable high pass filter 134, an adjustable gain amplifier 136 and an adjustable low pass filter 138. The adjustable gain amplifier can be implemented either through a voltage control amplifier or through adjusting the gain resistance of the amplifier itself. In the preferred embodiment the cutoff frequency for the high pass filter 134 is determined by a clock signal 140 from the Digital Signal Processor 142 (DSP). The setting of the gain amplifier 136 through the signal 144 from the DSP 142 determines the gain of the amplification stage. The cutoff frequency for the low pass filter is controlled by the signal 146 from the DSP 142. Those skilled in the art will appreciate that although in the preferred embodiment all of the settings are adaptively adjustable, one could select to set any or all of them.

The fundamental requirement for stage 130 is that the signal from the different receivers is sampled substantially simultaneously so that there is no appreciable time skew between the sampling of the different channels. Stage 130 can be implemented in many ways, three of which are most usable: one could choose to have one dedicated Analog to Digital Converter (A/D) for each channel; one could choose to have a set of Sample-And-Hold (S/H) amplifiers sampling substantially simultaneously and feeding a single A/D; or one could choose to have a multiplexed A/D if it could be sampled in a high enough frequency so that the inherent time skew between separate channels would become insignificant.

FIG. 15 shows an implementation of the S/H method. The signal from all receivers 124 as conditioned through stage 122 is input to a set of S/H amplifiers 148 and is available at the inputs of multiplexer 150. A counter 152 controlled by the DSP 142 through the clock signal 154 selects the appropriate channel of the multiplexer 150 to be digitized by A/D 156. The A/D output is latched into memory 158 through a latch 160. For ease of description memory 158 is shown as external to the DSP 142. A completely equivalent implementation would use data memory 158 internal to the DSP 142.

Figure 16:
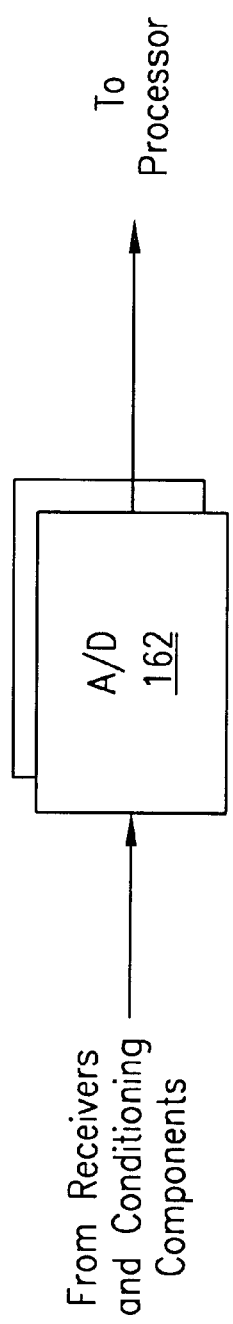
FIG. 16 is a block diagram of an alternative embodiment of the digitization electronics.
Figure 17:
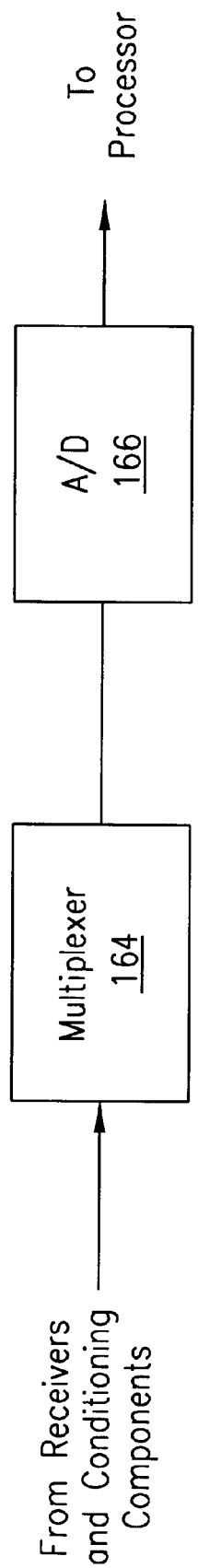
FIG. 17 is a block diagram of an alternative embodiment of the digitization electronics.

FIGS. 16 and 17 show alternative implementations of the digitization electronics just described. In FIG. 16, an A/D 162 is assigned to each channel. In FIG. 17, a multiplexer 164 selects signals to provide to a fast A/D 166.

Figure 18:
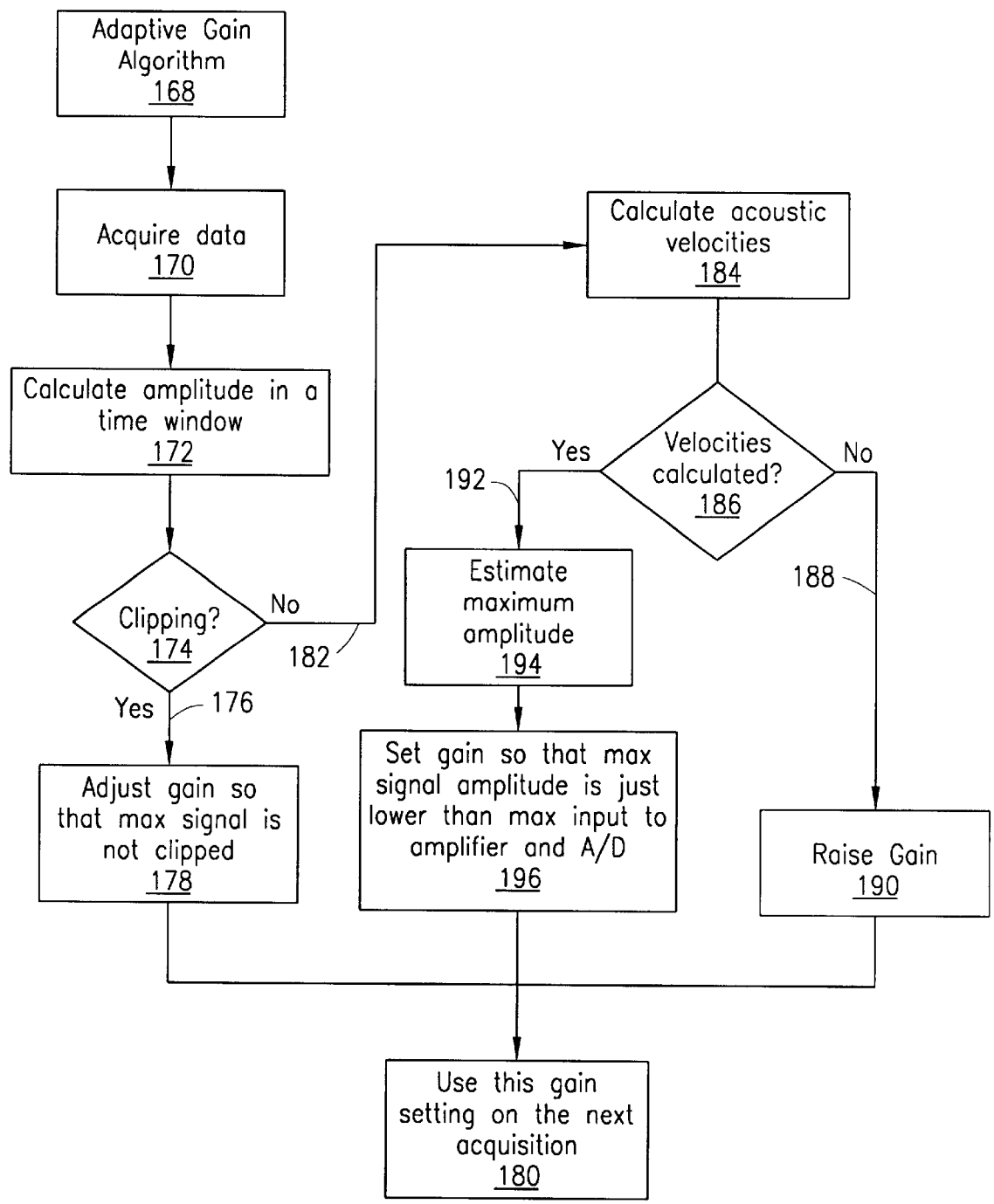
FIG. 18 is a flowchart for the basic adaptive gain algorithm for the gain stage of the signal conditioning part of the electronics for the acoustic logging tool of the present invention.

In the preferred embodiment the gain setting for the Gain Amplifier 136 is adaptively set, according to the method described in FIG. 18. The adaptive gain algorithm 168 starts with the acquisition of the data 170 from all receivers. A first test is performed 172 to determine if the amplitude signals within a selected time window are "clipped" 174 (amplitude exceeds maximum input amplitude to the Gain amplifier and the A/D converter).

If the signals are clipped 176 the gain is set such that the estimated maximum signal would not be clipped 178, and that gain setting is used in the next acquisition 180. If the signals are not clipped 182 a different path is followed. All pertinent acoustic velocities are calculated 184 with the method described in FIG. 20. A test is then performed 186 to see if the velocities were calculated. If the signals were too low no velocity calculations would be possible. At that time 188 the gain is adjusted higher by a predetermined percentage 190, and that gain is used in the next acquisition 180. If the velocities were successfully calculated (signal amplitudes within a usable range) a different path 192 is followed. The amplitudes of the signals of the calculated acoustic velocities are then compared to each other and the maximum amplitude is estimated 194. The gain is then set 196 with DSP signal 144 such that the gain-adjusted amplitude of the maximum velocity would be slightly less than the maximum amplitude accepted as an input to the A/D converter 156. This gain is then used to acquire 180 the next set of data from the receivers. In the preferred embodiment, blocks 184, 186, 194 and 190 are skipped (for ease of implementation) when no clipping occurs. In that case, path 182 connects directly to block 196.

Figure 19:
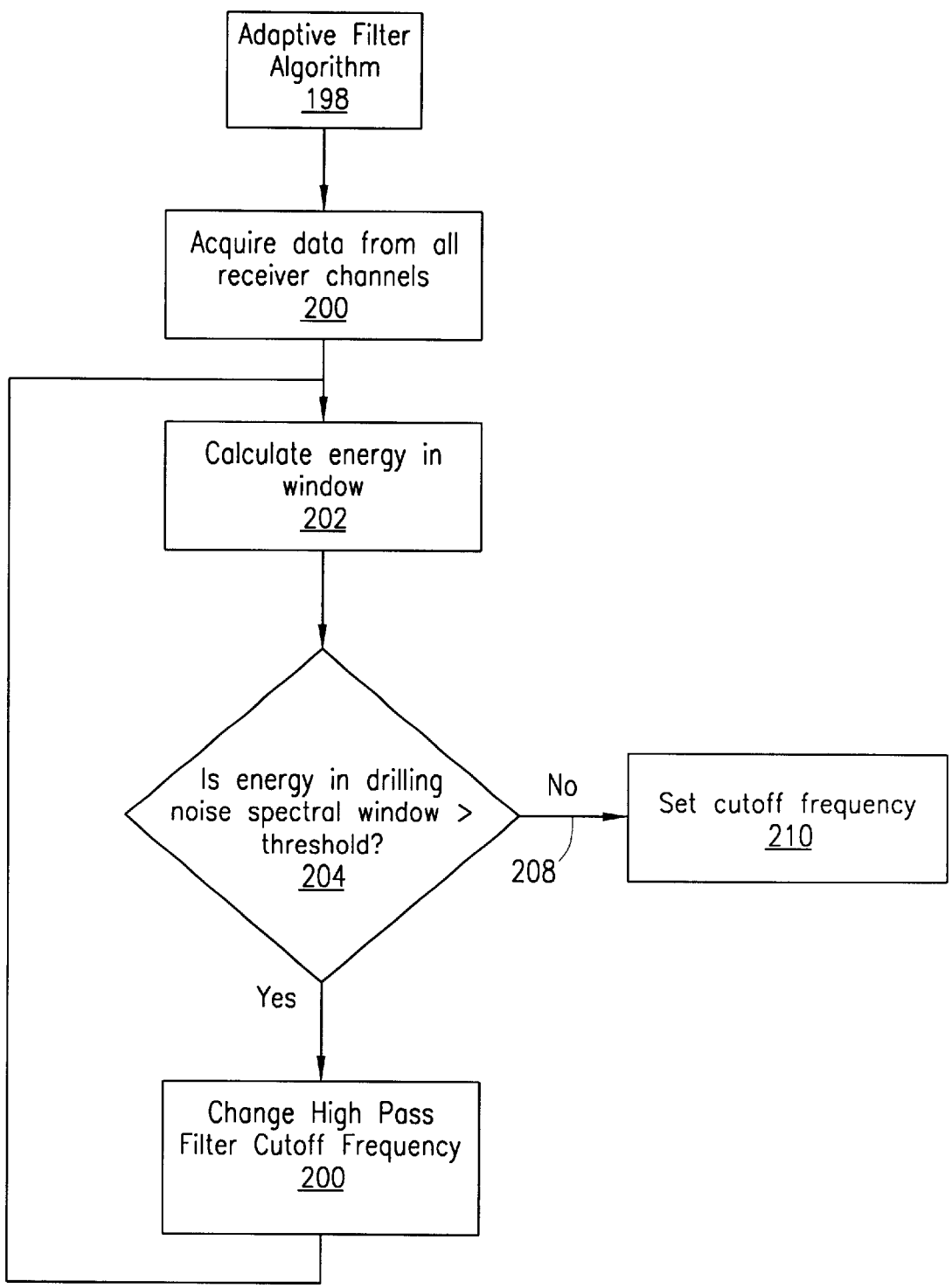
FIG. 19 is a flowchart for the basic adaptive filter algorithm for the high pass filter of the signal conditioning part of the electronics for the acoustic logging tool of the present invention.

The high pass filter cutoff frequency is adaptively set according to the method described in FIG. 19. The adaptive filter algorithm 198 starts with the acquisition of data from all receiver channels 200. The energy content of the drilling noise in a window at the beginning of these waveforms is then calculated 202 and compared to a preset programmable threshold 204. If the energy level in the window exceeds the threshold the high pass filter cutoff frequency is changed 206 and the loop repeats until the energy is less than the threshold. At that time 208 the cutoff frequency is set 210 with DSP signal 140 (reference FIG. 15).

There are several methods that can be used to estimate the acoustic velocities of the pertinent acoustic waves. Those skilled in the art know that the simplest is threshold detection. The next level of complexity would involve a correlation type method such as N-th root stack or multi-receiver velocity moveout cross-correlation. Yet another level of complexity would be the utilization of the Maximum Likelihood Method. Still another level of complexity would involve Prony's method. Another level of complexity would include the wavelet transform. Yet a higher level of complexity would involve neural networks or genetic algorithms. As the methods become more and more complex the computing power requirements increase significantly. Accordingly one could assign an index number to each algorithm, the index number increasing with algorithm complexity.

In the present embodiment decision logic is utilized to select the most appropriate algorithm to be utilized for the estimation of the acoustic velocities. The estimation of the acoustic velocities is adaptively performed according to the method 212 described in FIG. 20.

The method starts by collecting the data from all channels 214. The data are then band-pass filtered 216 as required to eliminate ambient noise, including but not limited to that from drilling, drilling fluid circulation and tool movement induced pressure variations. An index is initialized 218, the index referring to the appropriate velocity estimation algorithm. The algorithm is then used to calculate 220 the acoustic velocities. A weighted error function is then estimated 222 that effectively determines the likelihood that the estimated acoustic velocities are the correct ones. The error function is the weighted average of a previous set of acoustic velocities coupled with the uncertainty of the current acoustic velocities. The error function is then compared 224 with a programmable threshold. If the limit is exceeded 226 then the algorithm index is increased 228 and the loop repeats by utilizing the next algorithm in the series. The process repeats until the error function no longer exceeds the limit 230, at which time the calculated acoustic velocities are considered final 232.

The preferred embodiment includes a data storage module 104 to which the data is stored in non-volatile memory, such as EEPROM or FLASH or battery backed RAM. It is known to those skilled in the art that the data from acoustic logging, be it wireline or logging-while drilling, requires a large amount of storage. In the preferred embodiment the data is compressed before storage and error-correction-code is applied to the data to eliminate storage errors. The preferred compression method amongst the ones well known to those skilled in the art is adaptively selected based on the mission requirements and the available storage memory. Similarly the preferred error-correction-code is adaptively selected based on the available storage memory.

The foregoing describes preferred embodiments of the invention and is given by way of example only. Although the description of the preferred embodiment is that for an acoustic logging-while-drilling tool, a very similar description would apply to a wireline tool. The invention is not limited to any of the specific features described herein, but includes all variations thereof within the scope of the appended claims.

What is claimed is:

1. An acoustic logging tool comprising
    a transmit module configured to cause one or more acoustic transmitters to transmit acoustic energy;
    a data acquisition module configured to accept signals from one or more acoustic receivers, convert the signals to unprocessed data and to process the unprocessed data to produce one or more formation acoustic velocities; and
    a data storage module configured to compress and store the one or more formation acoustic velocities.

2. The acoustic logging tool of claim 1 wherein
    the data storage module is configured to store the unprocessed data.

3. The acoustic logging tool of claim 2 wherein
    the data storage module is configured to store processed and unprocessed data for an entire mission.

4. An acoustic logging tool comprising
    a transmit module configured to cause one or more acoustic transmitters to transmit acoustic energy;
    a data acquisition module configured to accept signals from one or more acoustic receivers, convert the signals to unprocessed data and to process the unprocessed data to produce processed data; and
    a data storage module configured to compress and store the processed data.

5. The acoustic logging tool of claim 4 wherein
    the data storage module adaptively chooses a compression algorithm to compress the processed data.

6. The acoustic logging tool of claim 1 wherein
    the data storage module is configured to apply error correction code to the processed data before storage.

7. The acoustic logging tool of claim 6 wherein
    the data storage module adaptively chooses an error correction coding algorithm to apply error correction code to the processed data before storage.

8. A logging-while-drilling acoustic logging tool comprising
    a processor;
    a computer-readable medium coupled to the processor having computer-readable program code embodied thereon for controlling the operation of the logging-while-drilling acoustic tool;
    two or more azimuthally offset acoustic transmitters coupled to the processor, each acoustic transmitter being independently controlled to generate acoustic energy having a respective frequency, amplitude and start time; and
    the computer-readable program code comprising computer-readable program code for causing the processor to control the respective frequency, amplitude and start time of the acoustic energy generated by the two or more acoustic transmitters.

9. The logging-while-drilling acoustic logging tool of claim 8, wherein the computer-readable program code further comprises computer-readable code for causing the processor to:
    collect data from two or more acoustic receivers; and
    compute one or more formation acoustic velocities using the collected data.

10. The logging-while-drilling acoustic logging tool of claim 8, wherein the computer-readable program code further comprises computer-readable code for causing the processor to:
    store the computed one or more acoustic velocities in the data memory.

11. The logging-while-drilling acoustic logging tool of claim 8, wherein the computer-readable program code further comprises computer-readable code for causing the processor to:
    provide the collected data to a communication device configured to transmit the collected data.

12. The logging-while-drilling acoustic logging tool of claim 8, wherein the computer-readable program code further comprises computer-readable code for causing the processor to:
    provide the computed one or more acoustic velocities to a communication device configured to transmit the computed velocity.

13. A method for acoustic logging-while-drilling using an acoustic logging tool comprising a processor, two or more acoustic transmitters under processor control and one or more acoustic receivers under processor control, the method comprising
    spacing one or more elements of a set comprising the transmitters and the receivers azimuthally apart from one or more of the remaining elements of the set;

specifying the respective frequency, amplitude and start time of the acoustic energy generated by each of the two or more transmitters;

firing the two or more acoustic transmitters in accordance with the specified respective frequency amplitude and start time; and collecting data from the receivers.

14. The method of claim 13 further comprising computing one or more formation velocities from the collected data.

15. The method of claim 14 further comprising storing the computed one or more formation velocities.

16. The method of claim 13 further comprising storing the collected data.

17. A logging-while-drilling acoustic logging tool comprising a processor;

a data memory coupled to the processor;

two or more azimuthally offset acoustic receivers coupled to the processor; and a computer-readable medium coupled to the processor having computer-readable program code embodied thereon for controlling the operation of the logging-while-drilling acoustic tool, wherein the computer-readable program code comprises computer-readable program code for causing the processor to (a) collect data from the two or more acoustic receivers; (b) compute one or more formation acoustic velocities using the collected data; and (c) store the computed one or more acoustic velocities in the data memory.

18. The logging-while-drilling acoustic logging tool of claim 17, wherein the computer-readable program code further comprises computer-readable code for causing the processor to:

provide the collected data to a communication device configured to transmit the collected data.

19. The logging-while-drilling acoustic logging tool of claim 17, wherein the computer-readable program code further comprises computer-readable code for causing the processor to:

provide the computed one or more acoustic velocities to a communication device configured to transmit the computed velocity.

20. A logging-while-drilling acoustic logging tool comprising two or more selectively-fired acoustic transmitters coupled to a body, wherein each of the acoustic transmitters is configured to emit acoustic energy having an independently selectable frequency, amplitude and start time;

one or more acoustic receivers coupled to the body;

wherein one or more elements of a set comprising the acoustic receivers and the acoustic transmitters are spaced azimuthally apart from one or more of the remaining elements of the set.

* * * * *